(12) United States Patent
Tomita

(10) Patent No.: US 11,680,956 B2
(45) Date of Patent: Jun. 20, 2023

(54) ROTATION DETECTION DEVICE

(71) Applicant: Hitachi Metals, Ltd., Tokyo (JP)

(72) Inventor: Kazuhiko Tomita, Tokyo (JP)

(73) Assignee: PROTERIAL, LTD., Tokyo (JP)

( * ) Notice: Subject to any disclaimer, the term of this patent is extended or adjusted under 35 U.S.C. 154(b) by 29 days.

(21) Appl. No.: 17/380,463

(22) Filed: Jul. 20, 2021

(65) Prior Publication Data

US 2022/0026458 A1 Jan. 27, 2022

(30) Foreign Application Priority Data

Jul. 23, 2020 (JP) .............................. JP2020-125899

(51) Int. Cl.
*G01P 3/44* (2006.01)
(52) U.S. Cl.
CPC ....................................... *G01P 3/44* (2013.01)
(58) Field of Classification Search
CPC .. G01P 3/44; G01P 3/443; G01P 3/446; G01P 3/46; G01P 3/465; G01P 3/487
See application file for complete search history.

(56) References Cited

U.S. PATENT DOCUMENTS

| | | | | |
|---|---|---|---|---|
| 2005/0047692 A1* | 3/2005 | Niebling | ................. | G01P 3/443 384/448 |
| 2008/0083168 A1* | 4/2008 | Booth | ................... | E05F 15/646 324/179 |
| 2017/0153265 A1* | 6/2017 | Yamamoto | .............. | G01P 3/487 |
| 2021/0293280 A1* | 9/2021 | Jeon | ........................ | F16C 43/04 |

FOREIGN PATENT DOCUMENTS

JP 2013-047636 A 3/2013

* cited by examiner

*Primary Examiner* — Son T Le
*Assistant Examiner* — Adam S Clarke
(74) *Attorney, Agent, or Firm* — Thomas W. Cole; Calderon Safran & Cole P.C.

(57) ABSTRACT

A rotation detection device includes a detected member being mounted to a rotating member and being configured to rotate integrally with the rotating member, and a sensor section being arranged to face the detected member, in which the sensor section includes two magnetic sensors, each of which includes a detection section having a magnetism detection element for detecting a magnetic field from the detected member, the two detection sections of the two magnetic sensors being arranged side-by side along a rotational axis line direction, and a housing portion comprising a resin mold provided to collectively cover the two magnetic sensors and having a facing surface facing the detected member. The two detection sections of the two magnetic sensors are separated each other. A minimum distance between the two detection sections of the two magnetic sensors is 0.05 mm or more and 2.00 mm or less. The resin mold enters into a space between the two detection sections of the two magnetic sensors.

7 Claims, 6 Drawing Sheets

ROTATION DETECTION DEVICE

CROSS-REFERENCE TO RELATED APPLICATION

The present application is based on Japanese patent application No. 2020-125899 filed on Jul. 23, 2020, the entire contents of which are incorporated herein by reference.

BACKGROUND OF THE INVENTION

1. Field of the Invention

The present invention relates to a rotation detection device for detecting, for example, a rotational speed of a rotating member to be detected.

2. Description of the Related Art

Conventionally, a rotation detection device, which is used on e.g., a bearing unit for a wheel to detect a rotational speed of a rotating member rotating with the wheel (see e.g., JP2013-47636A), has been known.

JP2013-47636A discloses a rotation detection device provided with a detected member (i.e., a member to be detected or a detection target member) which is attached to a rotating member and has plural magnetic poles along a circumferential direction of the rotating member, and a magnetic sensor which is attached to a stationary member rotatably supporting the rotating member and has a detection element for detecting a magnetic field of the detected member.

Patent Document 1: JP 2013-047636A

SUMMARY OF THE INVENTION

As described above, rotation detection devices for measuring a rotational speed of a wheel are desired to have plural magnetic sensors so that the rotational speed of wheel can be detected even in case of failure, etc. of a certain magnetic sensor or so that the rotational speed of wheel can be detected more accurately.

When using plural magnetic sensors accommodated in the housing portion, a size of the entire housing portion is increased and this may cause a problem that, e.g., it is not possible to insert the housing portion into a housing portion-holding hole. Therefore, there is a demand for a housing portion which can keep a small size even when mounting plural magnetic sensors.

It is an object of the invention to provide a rotation detection device in which a housing portion can have a small size while having plural magnetic sensors.

To solve the above-mentioned problem, one aspect of the invention provides a rotation detection device comprising: a detected member being mounted to a rotating member and being configured to rotate integrally with the rotating member; and a sensor section being arranged to face the detected member, wherein the sensor section comprises two magnetic sensors, each of which comprises a detection section comprising a magnetism detection element for detecting a magnetic field from the detected member, the two detection sections of the two magnetic sensors being arranged side-by-side along a rotational axis line direction, and a housing portion comprising a resin mold provided to collectively cover the two magnetic sensors and having a facing surface facing the detected member, wherein the two detection sections of the two magnetic sensors are separated each other, wherein a minimum distance between the two detection sections of the two magnetic sensors is 0.05 mm or more and 2.00 mm or less, and wherein the resin mold enters into a space between the two detection sections of the two magnetic sensors.

Points of Invention

According to the invention, it is possible to provide a rotation detection device in which a housing portion can have a small size while having plural magnetic sensors.

BRIEF DESCRIPTION OF THE DRAWINGS

Next, preferred embodiment according to the present invention will be described with reference to appended drawings, wherein.

DETAILED DESCRIPTION OF THE PREFERRED EMBODIMENTS

Embodiment

Embodiments of the present invention will be explained in conjunction with appended drawings.

(Configuration of Wheel Bearing Device 10)

Figure 1:
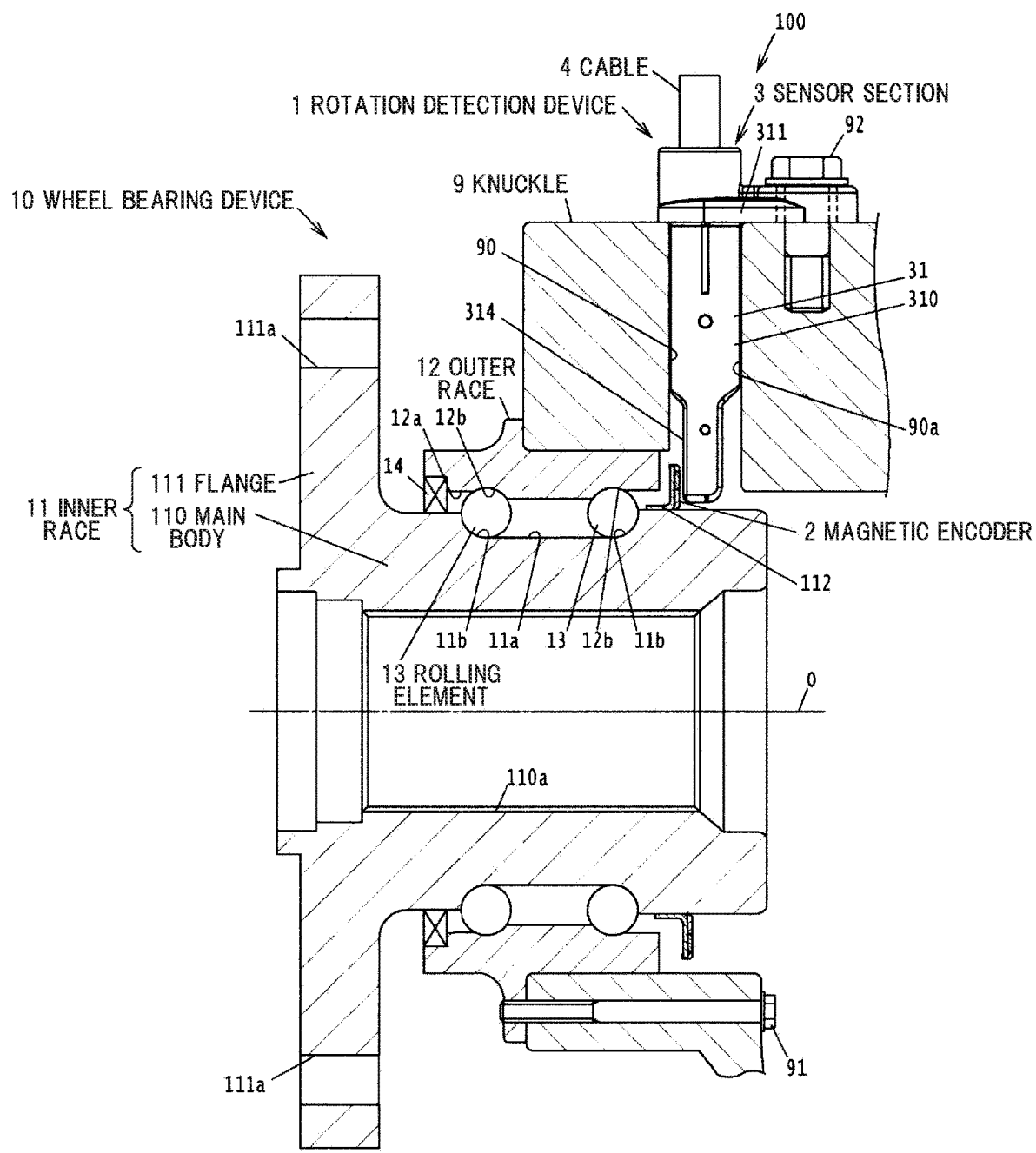
FIG. 1 is a cross sectional view showing a configuration example of a rotation detection device in an embodiment of the present invention and a vehicle wheel bearing device having the rotation detection device.

FIG. 1 is a cross sectional view showing a configuration example of a rotation detection device in an embodiment of the present invention and a vehicle wheel bearing device having the rotation detection device.

A wheel bearing device 10 comprises an inner race 11 as a rotating member having a cylindrical main body 110 and a flange 111 to be attached to a wheel, an outer race 12 arranged on an outer peripheral side of the main body 110 of the inner race 11, plural spherical rolling elements 13 arranged between a pair of raceway surfaces 11b, 11b formed on an outer surface 11a of the inner race 11 and a pair of raceway surfaces 12b, 12b formed on an outer surface 12a of the outer race 12, and a rotation detection device 1 for detecting a rotational speed of the inner race 11 with respect to the outer race 12 (i.e., a wheel speed).

A through-hole is formed at a middle portion of the main body 110 of the inner race 11 along a rotational axis line O. A spline fitting portion 110a for coupling a drive shaft (not shown) is formed at an inner surface of the through-hole. In addition, the pair of raceway surfaces 11b, 11b of the inner race 11 are formed parallel to each other and extend in a circumferential direction.

The flange 111 of the inner race 11 is provided integrally with the main body 110 so as to protrude radially outward of the main body 110 and. The flange 111 has plural through-holes 11a into which bolts for attachment to a wheel (not shown) are press-fitted.

The outer race 12 is formed in a cylindrical shape and is fixed, by plural bolts 91 (only one bolt 91 is shown in FIG.

1), to a knuckle 9 which is coupled to a vehicle body. The knuckle 9 is an example of a stationary member which rotatably supports the inner race 11. The pair of raceway surfaces 12b, 12b of the outer race 12 are formed parallel to each other and extend in a circumferential direction so as to face the pair of raceway surfaces 11b, 11b of the inner race 11. At an end of the inner race 11 on the side where the flange 111 of the inner race 11 is located, a sealing 14 is arranged between the inner race 11 and the outer race 12.

A holding hole 90 for holding a sensor section 3 of the rotation detection device 1 (to be described below) is formed in the knuckle 9. The holding hole 90 has a circular shape in a cross-section perpendicular to a central axis thereof and penetrates the knuckle 9 in a direction intersecting with the rotational axis line O. In more details, the holding hole 90 passes through the knuckle 9 in a radial direction of the rotational axis line O. The sensor section 3 (a housing portion 31) is inserted into the holding hole 90 in the direction intersecting with the rotational axis line O.

(Description of the Rotation Detection Device 1)

Figure 2:
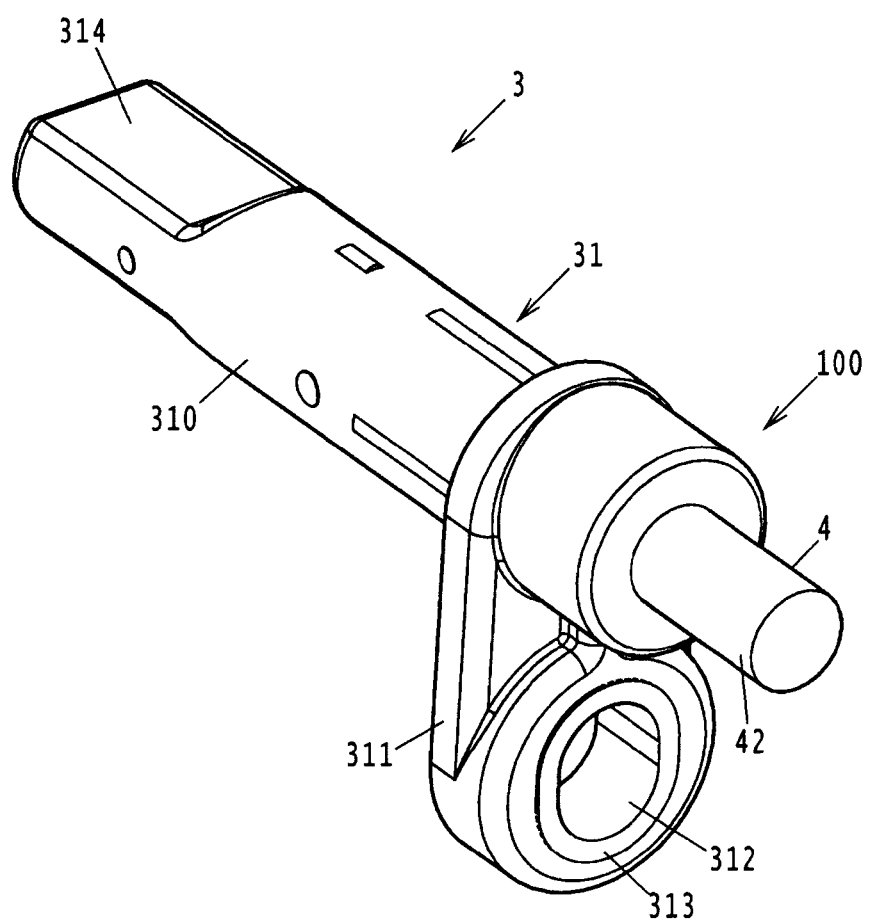
FIG. 2 is a perspective view showing a sensor section.
Figure 3A:
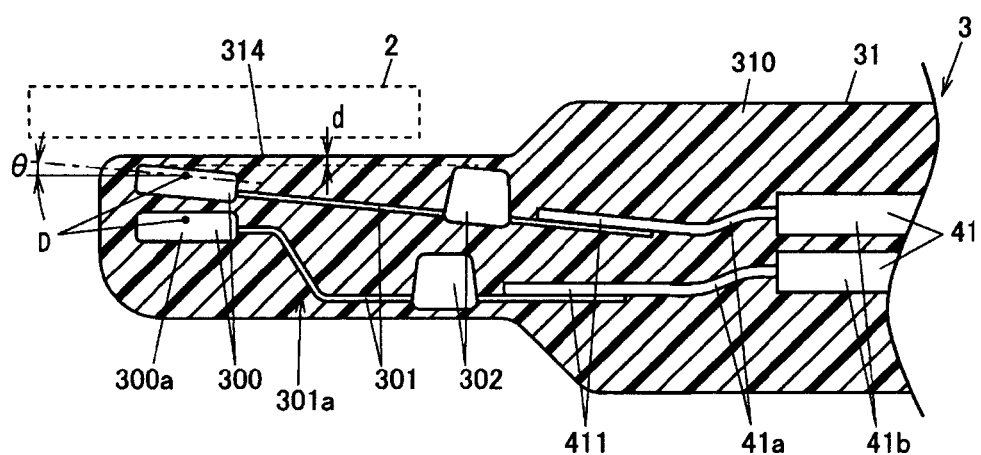
FIG. 3A is a cutaway diagram showing the sensor section.
Figure 3B:
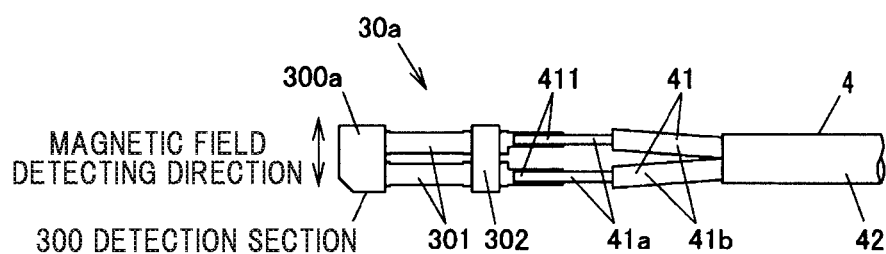
FIG. 3B is a top view showing a first magnetic sensor and electric wires.

FIG. 2 is a perspective view showing a sensor section. FIG. 3A is a cutaway diagram showing the sensor section. FIG. 3B is a top view showing a first magnetic sensor and electric wires.

As shown in FIGS. 1 to 3B, the rotation detection device 1 comprises a magnetic encoder 2 as a detected member, which is mounted to the inner race 11 as a rotating member, and has plural magnetic poles (not shown) arranged in a circumferential direction about a rotational axis (the rotational axis line O) of the inner race 11, and a sensor section 3 which is mounted to the knuckle 9 as a stationary member not-rotating with rotation of the inner race 11 and is arranged to face the magnetic encoder 2. In the present embodiment, for example, the rotation detection device 1 detects changes in rotational speed of the detected member by detecting change in magnetic field in accordance with rotation of the detected member. For example, the rotation detection device 1 is used for the Anti-lock Braking System (ABS).

The magnetic encoder 2 is formed in an annular shape having a thickness in a direction parallel to the rotational axis line O. The magnetic encoder 2 is supported by a support member 112 fixed to the outer surface 11a of the inner race 11 and is attached so as to rotate together with the inner race 11. In addition, the magnetic encoder 2 has N-poles and S-poles which face the sensor section 3 and are alternately arranged along the circumferential direction.

The sensor section 3 is provided at an end of a cable 4. The cable 4 having the sensor section 3 at an end is a cable with sensor 100. In the present embodiment, the magnetic encoder 2 and a side surface (a facing surface 314 to be described below) of a tip of the sensor section 3 face each other in an axial direction parallel to the rotational axis line O.

The cable 4 has two pairs of electric wires 41 corresponding to two magnetic sensors 30. Each electric wire 41 has a center conductor 41a formed of a stranded conductor formed by twisting highly conductive strands of copper, etc., and an insulation 41b formed of insulating resin such as crosslinked polyethylene and covering an outer periphery of the center conductor 41a. In addition, the cable 4 further has a sheath 42 collectively covering two pairs (four) electric wires 41.

The two pairs of the electric wires 41 are exposed from the sheath 42 at the end of cable 4. The center conductors 41a are exposed from the insulations 41b at an end of the electric wires 41. The center conductor 41a exposed from the insulation 41b is electrically connected to a connection terminal 301 of the corresponding magnetic sensor 30 by resistance welding. In the present embodiment, the strands of the center conductor 41a are joined (coupled) each other to form a straight joint 411 at the end of the center conductor 41a, then the joint 411 is resistance welded at an end of the connection terminal 301, so that the center conductor 41a and the connection terminal 301 are connected to each other.

In the rotation detection device 1 according to the present embodiment, the sensor section 3 has two magnetic sensors 30, and a housing portion 31 formed of a molded resin (hereafter simply referred to as a resin), which is provided to collectively cover the two magnetic sensors 30.

The magnetic sensor 30 has a plate-like (planer) detection section 300 including a magnetism detection element (not shown) for detecting magnetic a field from the magnetic encoder 2, and a pair of connection terminals 301 extended from the detection section 300. In the present embodiment, the magnetism detection element is composed of a Giant Magneto Resistive effect (GMR) element. In the meantime, an Anisotropic Magneto Resistive (AMR) element, a Tunneling Magneto Resistive (TMR) element, or Hall devices can be used as the magnetism detection element.

The detection section 300 has the magnetism detection element for detecting the magnetic field from the magnetic encoder 2, and a molded resin part 300a as a cover that covers the magnetism detection element. The detection section 300 is formed in a substantially rectangular shape in a top view (a rectangular shape in which one of four corners is chamfered). The detection section 300 may also have an additional signal processing circuit (not shown) for processing a signal output from the magnetism detection element. The signal processing circuit may be covered by the molded resin part 300a together with the magnetism detection element.

The pair of the connection terminals 301 extend from one long side of the detection section 300 (a long side not connected to the chamfered corner) in a direction perpendicular to the long side, and the two connection terminals 301 are formed parallel to each other. In the present embodiment, both the connection terminals 301 are formed in a strip shape (elongated planar shape), and tips thereof (ends opposite to the detection section 300) are electrically connected to the center conductors 41a (the joints 411) of the corresponding electric wires 41.

Although it is not shown in the drawings, a capacitance for suppressing noise is connected between the two connection terminals 301, and a capacitance protective portion 302 formed of a resin mold is provided to cover the capacitance and a portion of the connection terminals 301 connected to the capacitance.

The two magnetic sensors 30 are arranged in such a manner that the two detection sections 300 overlap in a direction along which the sensor section 3 and the magnetic encoder 2 face each other. Hereinafter, one of the two magnetic sensors 30, which is arranged on one side closer to the magnetic encoder 2, is referred to as a first magnetic sensor 30a, and the other of the two magnetic sensors 30, which is arranged on the other side far from the magnetic encoder 2, is referred to as a second magnetic sensor 30b. Details of the arrangement of the two magnetic sensors 30a and 30b will be described below.

The housing portion 31 integrally has a main body 310 collectively covering the magnetic sensor 30 and an end of the cable 4, and a flange 311 for fixing the sensor section 3 to the knuckle 9. A bolt hole 312 for inserting a bolt 92 (see FIG. 1) used to fix the sensor section 3 to the knuckle 9 is formed in the flange 311. A metal collar 313 for suppressing deformation of the flange 311 due to bolt fixation is formed in the bolt hole 312 along an inner surface of the bolt hole 312.

A flat facing surface 314 which faces the magnetic encoder 2 is formed on a side surface at a tip portion (an end portion opposite to the side where the cable 4 extends out) of the main body 310 of the housing portion 31. The sensor section 3 is fixed to the knuckle 9 in such a manner that the facing surface 314 faces the magnetic encoder 2 (facing in the axial direction parallel to the rotational axis line O). In the meantime, the facing surface 314 is not limited to a flat surface, may be a rounded (e.g., hemispherical shape) surface.

It is possible to use the housing portion 31 formed of, e.g., polyamide (PA) 612 grade, nylon 66 (Nylon is a registered trademark), or polybutylene terephthalate (PBT), etc. In addition, the resin including glass filler can be used as the resin used for the housing portion 31.

(Arrangement of the First Magnetic Sensor 30a and the Second Magnetic Sensor 30b, etc.)

Figure 5:
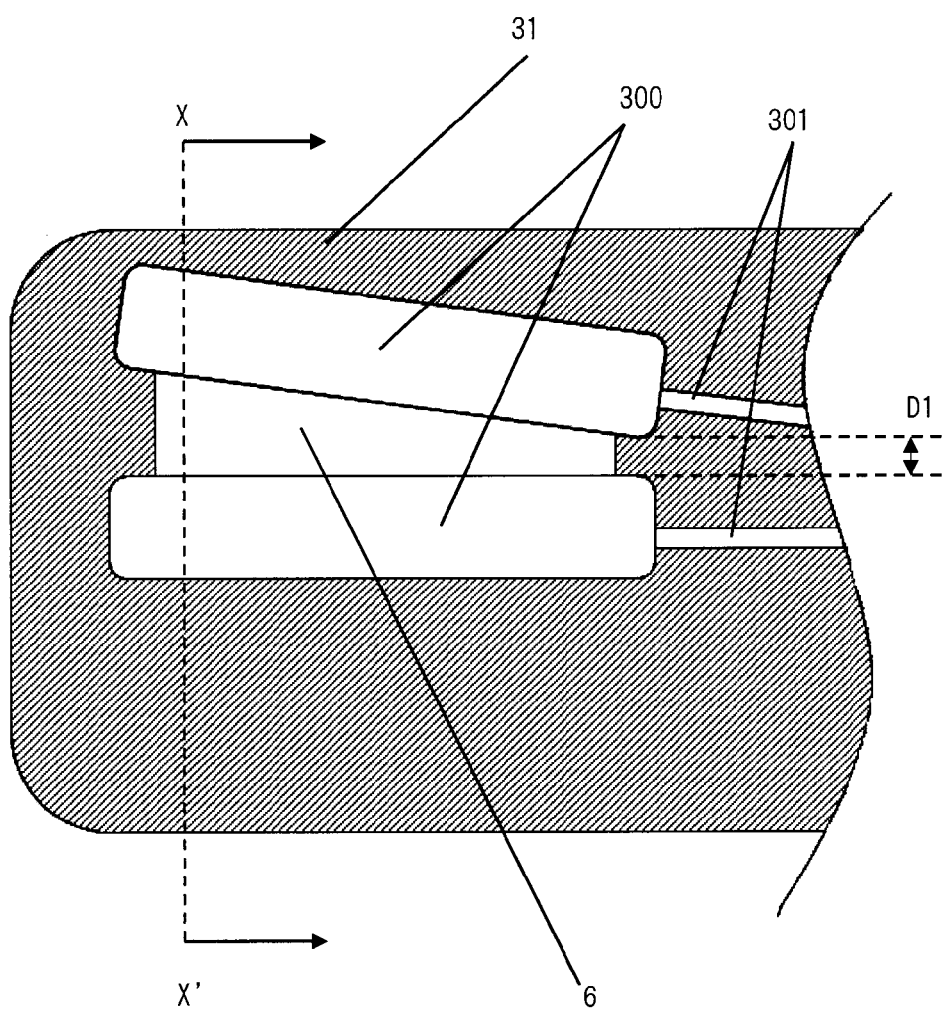
FIG. 5 is a cutaway diagram showing an enlarged view of an essential part of a housing portion in a variation 2.

In the rotation detection device 1 according to the present embodiment, the detection section 300 of the first magnetic sensor 30a and the detection section 300 of the second magnetic sensor 30b are arranged side-by-side along the rotational axis line O (i.e., overlapping when viewed along the rotational axis line O direction). In the present embodiment, the detection section 300 of the first magnetic sensor 30a and the detection section 300 of the second magnetic sensor 30b are arranged side-by-side with a part of the magnetic encoder 2 along the rotational axis line O. In addition, the detection section 300 of the first magnetic sensor 30a and the detection section 300 of the second magnetic sensor 30b are distant (separated) from each other in the rotational axis line O direction in such a manner that a minimum distance is 0.05 mm or more and 2.00 mm or less. As described below, in the present embodiment, the detection section 300 of the first magnetic sensor 30a is tilted with respect to the detection section 300 of the second magnetic sensor 30b. Thus, the minimum distance between the detection section 300 of the first magnetic sensor 30a and the detection section 300 of the second magnetic sensor 30b is, e.g., a distance D1 as shown in FIG. 5. In addition, the detection section 300 of the first magnetic sensor 30a may not be tilted (i.e., may be parallel) with respect to the detection section 300 of the second magnetic sensor 30b. In this case, the distance between the detection section 300 of the first magnetic sensor 30a and the detection section 300 of the second magnetic sensor 30b is constant across a region where the detection section 300 of the first magnetic sensor 30a and the detection section 300 of the second magnetic sensor 30b are facing each other. That is, in this case, the distance between the detection section 300 of the first magnetic sensor 30a and the detection section 300 of the second magnetic sensor 30b is 0.05 mm or more and 2.00 mm or less across the range where the detection section 300 of the first magnetic sensor 30a faces the detection section 300 of the second magnetic sensor 30b.

As described above, the detection section 300 of the first magnetic sensor 30a and the detection section 300 of the second magnetic sensor 30b are arranged side-by-side along the rotational axis line O direction. Hereby, it is possible to suppress the increase in size of the housing portion 31 even when plural magnetic sensors 30 are used to increase redundancy or improve detection accuracy. For more details, it is possible to suppress the increase in length of the magnetic encoder 2-side tip portion of the housing portion 31 (the tip portion of the body part 310) in the direction perpendicular to the rotational axis line O direction (i.e., a width of the magnetic encoder 2-side tip portion of the housing portion 31).

In addition, since the detection section 300 of the first magnetic sensor 30a and the detection section 300 of the second magnetic sensor 30b are distant (separated) from each other, as shown in FIG. 3A, the molding resin constituting the housing portion 31 enters between the two detection sections 300. Thus, as shown in FIG. 3A, the two detection sections 300 are surrounded by the resin mold along the respective circumferential directions (in the cross-sectional view). Therefore, it is possible to improve a retention of the two detection sections 300 by the housing portion 31.

In addition, the minimum distance between the detection section 300 of the first magnetic sensor 30a and the detection section 300 of the second magnetic sensor 30b is 0.05 mm or more and 2.00 mm or less. It allows the molding resin to enter between the two detection sections 300 in the process of resin molding the housing portion 31 more easily by setting the distance to 0.05 mm or more. If the distance is less than 0.05 mm, a space between the two detection sections 300 with no molding resin may be formed in the process of resin molding the housing portion 31. In addition, if the distance is 2.00 mm or less, it is possible to suppress the decrease in detection sensitivity of the detection section 300 of the second magnetic sensor 30b. If the distance is more than 2.00 mm, the detection section 300 of the second magnetic sensor 30b is too distant (separated) from the magnetic encoder 2 and thus the detection sensitivity may greatly reduce. In addition, it is preferable to set the minimum distance between the detection section 300 of the first magnetic sensor 30a and the detection section 300 of the second magnetic sensor 30b to 0.10 mm or more and 1.00 mm or less. Hereby, it is possible to enter the resin between the two detection sections 300 more easily and additionally suppress the decrease in detection sensitivity of the detection section 300 of the second magnetic sensor 30b.

In the rotation detection device 1 according to the present embodiment, the detection section 300 of the first magnetic sensor 30a arranged on the magnetic encoder 2-side is arranged to be tilted with respect to the facing surface 314. The first magnetic sensor 30a is arranged in such a manner that a short-sided direction of the detection section 300 (the extended-out direction of the connection terminal 301) is tilted with respect to the facing surface. A long-sided direction of the detection section 300 is parallel to the facing surface 314. The detection section 300 of the first magnetic sensor 30a is arranged in such a manner that an extending side of the connection terminal 301 is gradually away from the facing surface 314.

It is possible for the detection section 300 of the first magnetic sensor 30a to be closer to the facing surface 314 by arranging the detection section 300 of the first magnetic sensor 30a to be tilted with respect to the facing surface 314. And thus, it is possible to decrease the space between a detection section D of the magnetism detection element and the magnetic encoder 2 and improve the detection sensitivity.

Figure 4:
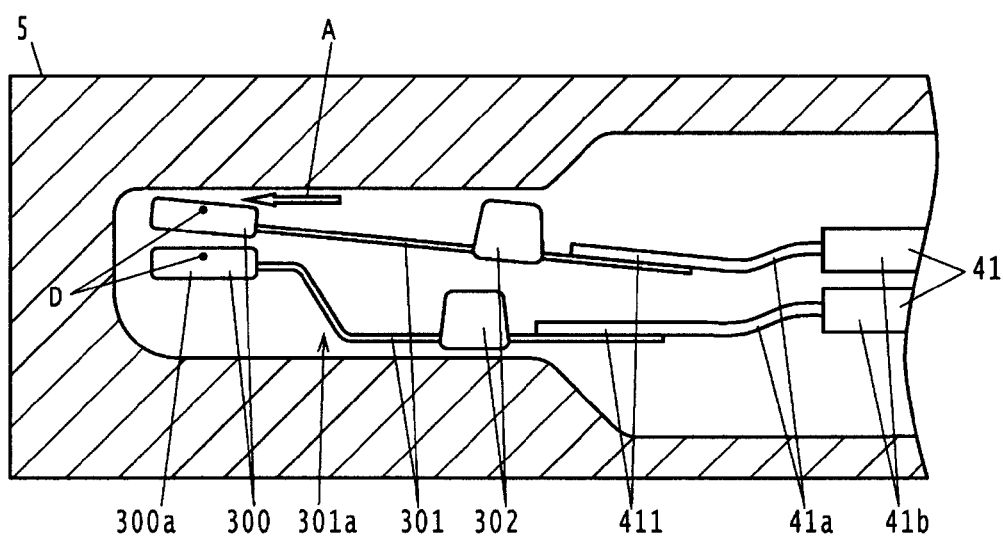
FIG. 4 is an explanatory diagram showing a flow of resin in resin molding.

In addition, by arranging the detection section 300 of the first magnetic sensor 30a to be tilted with respect to the facing surface 314, the resin will enter between a die and the detection section 300 in the process of resin molding more easily, as compared to a configuration in which the detection section 300 is arranged parallel to the facing surface 314, and thus it is less likely to cause molding defects. Specifically, as shown by the arrow A in FIG. 4, since the resin flows between the detection section 300 of the first magnetic sensor 30a and the die 5 from a wide side to a narrow side of the space between the detection section 300 and the die 5 to a narrow side of the space (from the right side to the left side in FIG. 4) in the process of resin molding for the housing portion 31 and the resin easily enters between the detection section 300 of the first magnetic sensor 30a and the die 5, it is less likely to cause molding defects. In addition, although it is not shown in FIG. 4, the magnetic sensors 30a and 30b are preferably set in the die 5 with being held by a resin holder in the process of resin molding for the housing portion 31.

In addition, in the present embodiment, the capacitance protective portion 302 is provided to protrude toward the facing surface 314 of the connection terminal 301. By arranging the first magnetic sensor 30a to be tilted, it is possible to suppress the capacitance protective portion 302 to be exposed (to protrude) from the housing portion 31, while making the detection section 300 closer to the facing surface 314.

If the distance d (the minimum distance) between the detection section 300 of the first magnetic sensor 30a and the facing surface 314 is too small, it may cause molding defects even though the first magnetic sensor 30a is tilted. Therefore, it is preferable to set the distance d to 0.20 mm or more. In the present embodiment, by setting the space between the capacitance protective portion 302 and the facing surface 314 to be equivalent with the distance d, the resin easily enters between the capacitance protective portion 302 and the die 5, so that it is less likely to cause molding defects. In addition, it is preferable to set the distance d to 2.00 mm or less. Hereby, it is possible to suppress the decrease in detecting sensitivity of the detection section 300 of the first magnetic sensor 30a (caused by a separation from the magnetic encoder 2). It is further preferable to set the distance d to 0.40 mm or more and 1.50 mm or less.

In addition, if an angle θ of the detection section 300 of the first magnetic sensor 30a with respect to the facing surface 314 is too small, it will be difficult to make the resin enter between the detection section 300 and the die 5. Therefore, it is preferable to set the angle θ to 3 or more. Meanwhile, if the angle θ is too large, the detection section D of the magnetism detection element may be separated away from the facing surface 314 and thus the detecting sensitivity may be reduced. Therefore, it is preferable to set the angle θ to 10° or less. In addition, it is further preferable to set the angle θ to 4° or more and 9° or less.

In the rotation detection device 1, the magnetism detection element included in the detection section 300 is configured to detect magnetic fields in the direction perpendicular to the thickness direction of the detection section 300 and the extension direction of the connection terminal 301 (a vertical direction in FIG. 3B and a long side direction of the detection section 300). Thus, even if the detection section 300 is tilted with respect to the facing surface 314 (tilted toward the short side direction of the detection section 300), the magnetic field detecting direction in the magnetism detection element is maintained parallel to the facing surface 314.

The detection section 300 is configured in such a manner that the detection section D of the magnetism detection element is located on the side of the facing surface 314 with respect to the center in the thickness direction of the detection section 300. Hereby, it is possible for the detection section D to be closer to the facing surface 314, and thus, the space between the detection section D of the magnetism detection element and the magnetic encoder 2 can be shortened and the detecting sensitivity can be improved.

In addition, in the rotation detection device 1, the second magnetic sensor 30b is arranged in such a manner that the detection section 300 thereof is tilted with respect to the detection section 300 of the first magnetic sensor 30a. In other words, the detection section 300 of the first magnetic sensor 30a is tilted with respect to the detection section 300 of the second magnetic sensor 30b. In the present embodiment, the tilt of the detection section 300 of the second magnetic sensor 30b with respect to the facing surface 314 is smaller than that of the detection section 300 of the first magnetic sensor 30a with respect to the facing surface 314 (angle θ). For more details, in the present embodiment, the detection section 300 of the second magnetic sensor 30b is arranged parallel to the facing surface 314. The distance between the detection sections 300 of both the magnetic sensors 30a and 30b is gradually widened from the extended-out side of the connection terminal 301 to the tip portion of the sensor section 3.

In addition, the second magnetic sensor 30b has a bent portion 301a at its connection terminal 301. In the present embodiment, the bent portion 301a is formed by bending the connection terminal 301 of the second magnetic sensor 30b into a crank shape. Hereby, it is possible to suppress interference between the capacitance protective portion 302 of the second magnetic sensor 30b and the first magnetic sensor 30a, while keeping the detection section 300 of the second magnetic sensor 30b closer to the facing surface 314 (toward the detection section 300 of the first magnetic sensor 30a).

In addition, it is possible to set the tip portion (tip portion opposite to the detection section 300) of the connection terminal 301 of the second magnetic sensor 30b parallel to an extension direction of the cable 4 by forming the crank-like bent portion 301a on the connection terminal 301 of the second magnetic sensor 30b. Hereby, it is possible to arrange the electric wire 41 without forcibly bending the center conductor 41a of the electric wire 41 and thus it becomes easier to achieve a desired wiring layout in the sensor section 3. In the present embodiment, the straight joint 411 is provided at the end of the center conductor 41a and the sensor section 3 is configured in such a manner that the joint 411 partially protrudes from the connection terminal 301. Therefore, although a length of a freely bendable portion of the center conductor 41a is relatively short, it is possible to route the center conductor 41a without force, by setting the end of the connection terminal 301 parallel to the extension direction of the cable 4.

(Variation 1)

In the present embodiment, the detection section 300 of the second magnetic sensor 30b is arranged to be tilted with respect to the detection section 300 of the first magnetic sensor 30a, it is not limited thereto. The detection section 300 of the second magnetic sensor 30b may be arranged parallel to the detection section 300 of the first magnetic sensor 30a. Hereby, it is possible for the detection section 300 of the second magnetic sensor 30b to be closer to the facing surface 314. The distance between the detection section D and the magnetic encoder 2 of the magnetism detection element can be further reduced and it is possible to improve the detection sensitivity in the second magnetic sensor 30b.

(Variation 2)

Figure 6:
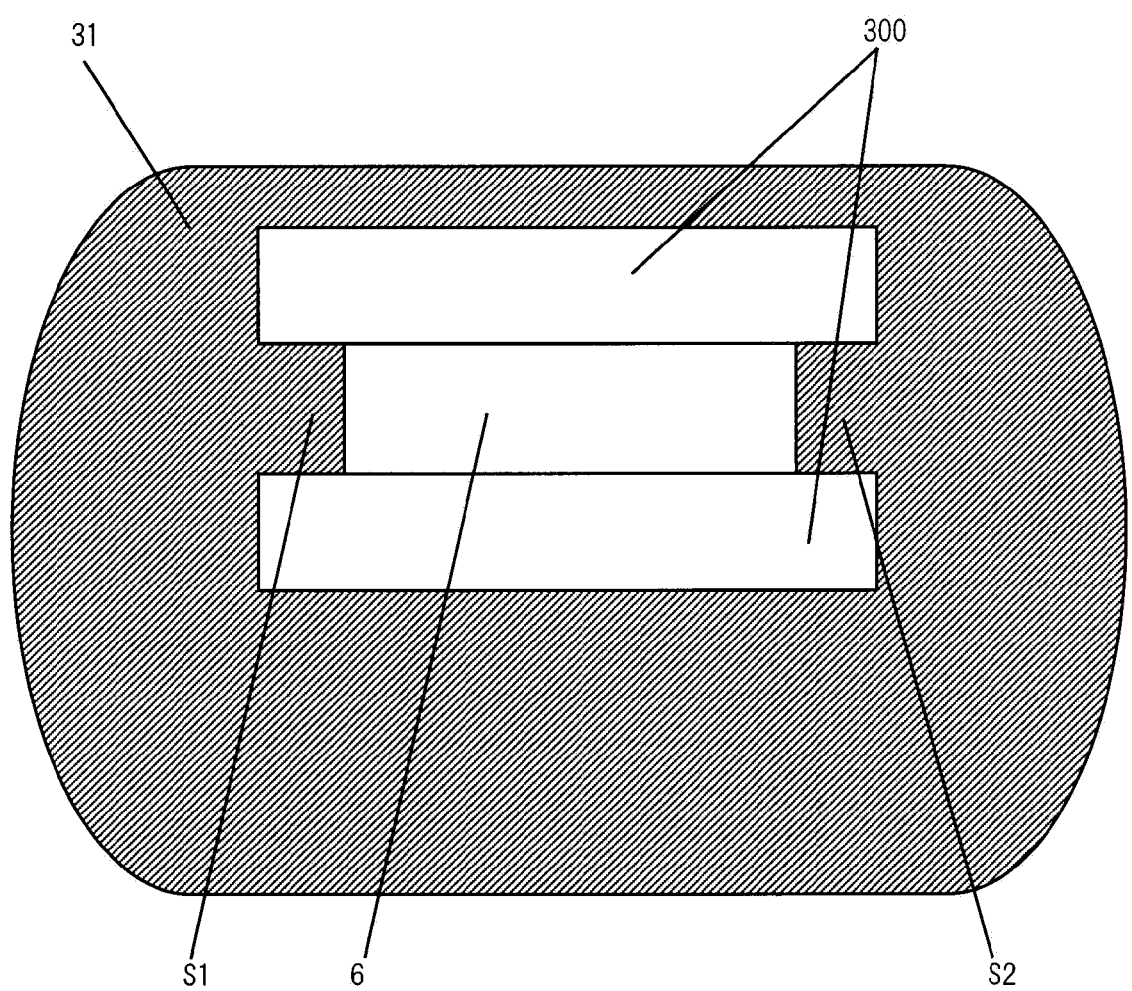
FIG. 6 is a cross sectional view showing the housing portion cut along line X-X'.

FIG. 5 is a cutaway diagram showing an enlarged view of an essential part of a housing portion in a variation 2. FIG. 6 is a cross sectional view showing the housing portion cut along line X-X'. Specifically, FIG. 5 is a cutaway diagram showing a part of the housing portion 31 according to the variation 2 at the tip portion of the main body 310.

In the variation 2, as shown in FIGS. 5 and 6, a holding member 6 is provided between the detection section 300 of the first magnetic sensor 30a and the detection section 300 of the second magnetic sensor 30b, which maintains the separation state of the two detection sections 300. For example, the holding member 6 is preferred to comprise the same materials with the material configuring the housing portion 31 such as polyamide (PA) 612, nylon 66 (Nylon is a registered trademark), and polybutylene terephthalate (PBT). The holding member 6 is collectively covered with the first magnetic sensor 30a and the second magnetic sensor 30b by the housing portion 31.

The holding member 6 contacts with the two detection sections 300. In the variation 2, as shown in FIG. 5, the holding member 6 is formed in a trapezium shape in a cross-sectional view. More specifically, in the cross sectional view, the holding member 6 has an upper base in the extended-out side of the connection terminal 301, a lower base in a tip portion side of sensor section 3 that is longer than the upper base, a first leg that connects one end of the upper base and one end of the lower base, and is tilted with respect to the facing surface 314, and the second leg that connects the other end of the upper base and the other end of the lower base and is parallel to the facing surface 314. The detection section 300 of the first magnetic sensor 30a contacts with the first leg. The detection section 300 of the second magnetic sensor 30b contacts with the second leg. The holding member 6 maintains the minimum distance D1 between the detection section 300 of the first magnetic sensor 30a and the detection section 300 of the second magnetic sensor 30b to 0.05 mm or more and 2.00 mm or less.

As shown in FIG. 6, the holding member 6 has a rectangular shape in the cross-sectional view cut along the line X-X'. That is, the holding member 6 is a trapezium columnar member. As shown in FIG. 6, the holding member 6 has a width (a length in the direction perpendicular to the rotational axis line O direction, i.e., the length in the horizontal direction in FIG. 6), which is narrower than widths of the two the detection sections 300. Hereby, the resin can enter into spaces S1, S2 in both sides of the holding member 6. That is, the variation 2 is configured in such a manner that the resin enters between the two detection sections 300 while the holding member 6 for maintaining the separation between the two detection sections 300 is provided. According to the variation 2, the molding resin (which constitutes the housing 31) surrounds the two detection sections 300 in the respective circumferential directions.

According to the variation 2, it is possible to suppress the variation in the distance between the two detection sections 300 by resin pressure in resin molding the housing portion 31, and as described above embodiment, it is possible to improve the retention of the two detection sections 300 in the housing portion 31.

In the variation 2, although the holding member 6 having a trapezoidal shape in the cross-sectional view is used as an example, when the detection section 300 of the first magnetic sensor 30a is parallel to the detection section 300 of the second magnetic sensor 30b, it is possible to use the holding member 6 having a rectangular shape, a square shape, or a parallel four-sided shape in the cross-sectional view. In addition, the holding member 6 can be formed integrally with an electric wire holder (not shown) for holding two pairs of the electric wires 41. In this case, the electric wire holder is preferably formed of the same material as the holding member 6. In addition, the holding member 6 may be a square shape in the cross-sectional view cut along the line X-X'.

SUMMARY OF THE EMBODIMENT

Next, the technical concept grasped from the above-described embodiment is described with reference to the signs or the like in the embodiment. However, each sign or the like in the following description is not limited to a member or the like specifically showing the elements in the following claims in the embodiment.

[1] A rotation detection device (1), comprising:
a detected member (2) being mounted to a rotating member (11) and being configured to rotate integrally with the rotating member (11); and
a sensor section (3) being arranged to face the detected member (2),
wherein the sensor section (3) comprises two magnetic sensors (30), each of which comprises a detection section (300) comprising a magnetism detection element for detecting a magnetic field from the detected member (2), the two detection sections (300) of the two magnetic sensors (30) being arranged side-by side along a rotational axis line (0) direction, and a housing portion (31) comprising a resin mold provided to collectively cover the two magnetic sensors (30) and having a facing surface (314) facing the detected member (2),
wherein the two detection sections (300) of the two magnetic sensors (30) are separated each other,
wherein a minimum distance between the two detection sections (300) of the two magnetic sensors (30) is 0.05 mm or more and 2.00 mm or less, and
wherein the resin mold enters into a space between the two detection sections (300) of the two magnetic sensors (30).

[2] The rotation detection device (1) according to [1] or [2], wherein the minimum distance between the two detection sections (300) of the two magnetic sensors (30) is 0.10 mm or more and 1.00 mm or less.

[3] The rotation detection device (1) according to [1] or [2], wherein the two magnetic sensors (30) comprise a first magnetic sensor (30a) and a second magnetic sensor (30b), the detection section (300) of the first magnetic sensor (30a), which is closer to the detected member (2) than the second magnetic sensor (30b), is tilted with respect to the facing surface (314).

[4] The rotation detection device (1) according to any one of [1] to [3], further comprising:
a holding member (6) being covered collectively with the two magnetic sensors (30) by the housing portion (31), being configured to maintain a separation state of the two detection sections (300) of the two magnetic sensors (30), and being arranged between the two detection sections (300) of the two magnetic sensors (30).

[5] The rotation detection device (1) according to [4], wherein a width of the holding member (6) is narrower than widths of the two detection sections (300) of the two magnetic sensors (30).

Although the embodiments of the invention have been described, the invention according to claims is not to be limited to the embodiments. In addition, please note that all combinations of the features described in the embodiments are not necessary to solve the problem of the invention.

Furthermore, the various kinds of modifications can be implemented without departing from the gist of the invention. For example, in the above embodiment, the case where each of the two magnetic sensors 30*a* and 30*b* has the capacitance for noise suppression and the capacitance protective portion 302 is explained. However, the capacitance and the capacitance protective portion 302 can be omitted.

Further, in the present embodiment, the connection terminal 301 of the first magnetic sensor 30*a* has a straight shape. However, the present invention is not limited thereto, the connection terminal 301 may have a bent portion. According to this configuration, the tip portion (the tip portion opposite to the detection section 300) of the connection terminal 301 is parallel to the extension direction of the cable 4, thereby it is possible to further improve the freedom of wiring layout in the sensor section 3.

In the present embodiment, the case where the facing surface 314 is formed on the side surface of the tip portion of the sensor section 3 is explained. However, the present invention is not limited thereto. A tip end surface of the sensor section 3 may be provided as the facing surface 314. In this case, the cable 4 is extended in a direction parallel to the rotational axis line O.

In addition, the number of the magnetic sensors 30 may be three or more. In this case, the minimum distance between the adjacent detection sections 300 is preferred to be 0.05 mm or more and 2.00 mm or less.

What is claimed is:

1. A rotation detection device, comprising:
   a detected member being mounted to a rotating member and being configured to rotate integrally with the rotating member; and
   a sensor section being arranged to face the detected member,
   wherein the sensor section comprises two magnetic sensors comprising a first magnetic sensor including a first detection section and a second magnetic sensor including a second detection section, each of the first detection section and the second detection section comprising a magnetism detection element for detecting a magnetic field from the detected member, and a housing portion comprising a resin mold provided to collectively cover the two magnetic sensors and having a facing surface facing the detected member,
   wherein the first and second detection sections of the two magnetic sensors are separated from each other,
   wherein a minimum distance between the first and second detection sections of the two magnetic sensors is 0.05 mm or more and 2.00 mm or less,
   wherein the resin mold enters into a space between the first and second detection sections of the two magnetic sensors,
   wherein the first detection section and the second detection section are arranged side-by-side along a rotational axis line direction of the rotating member, and
   wherein the first detection section is tilted with respect to the second detection section.

2. The rotation detection device according to claim 1, wherein the minimum distance between the first and second detection sections of the two magnetic sensors is 0.10 mm or more and 1.00 mm or less.

3. The rotation detection device according to claim 1, wherein the first detection section of the first magnetic sensor, which is closer to the detected member than the second magnetic sensor, is tilted with respect to the facing surface,
   wherein the first detection section is tilted with respect to the facing surface in such a manner that the first detection section being closer to the detected member as being closer to a tip portion of the housing.

4. The rotation detection device according to claim 3, wherein the second detection section of the second magnetic sensor is arranged parallel to the facing surface.

5. The rotation detection device according to claim 1, further comprising:
   a holding member being covered collectively with the two magnetic sensors by the housing portion, being configured to maintain a separation state of the first and second detection sections of the two magnetic sensors, and being arranged between the first and second detection sections of the two magnetic sensors.

6. The rotation detection device according to claim 5, wherein a width of the holding member is narrower than widths of the first and second detection sections of the two magnetic sensors.

7. The rotation detection device according to claim 1, wherein the second detection section of the second magnetic sensor is arranged parallel to the facing surface.

* * * * *